UNITED STATES PATENT OFFICE.

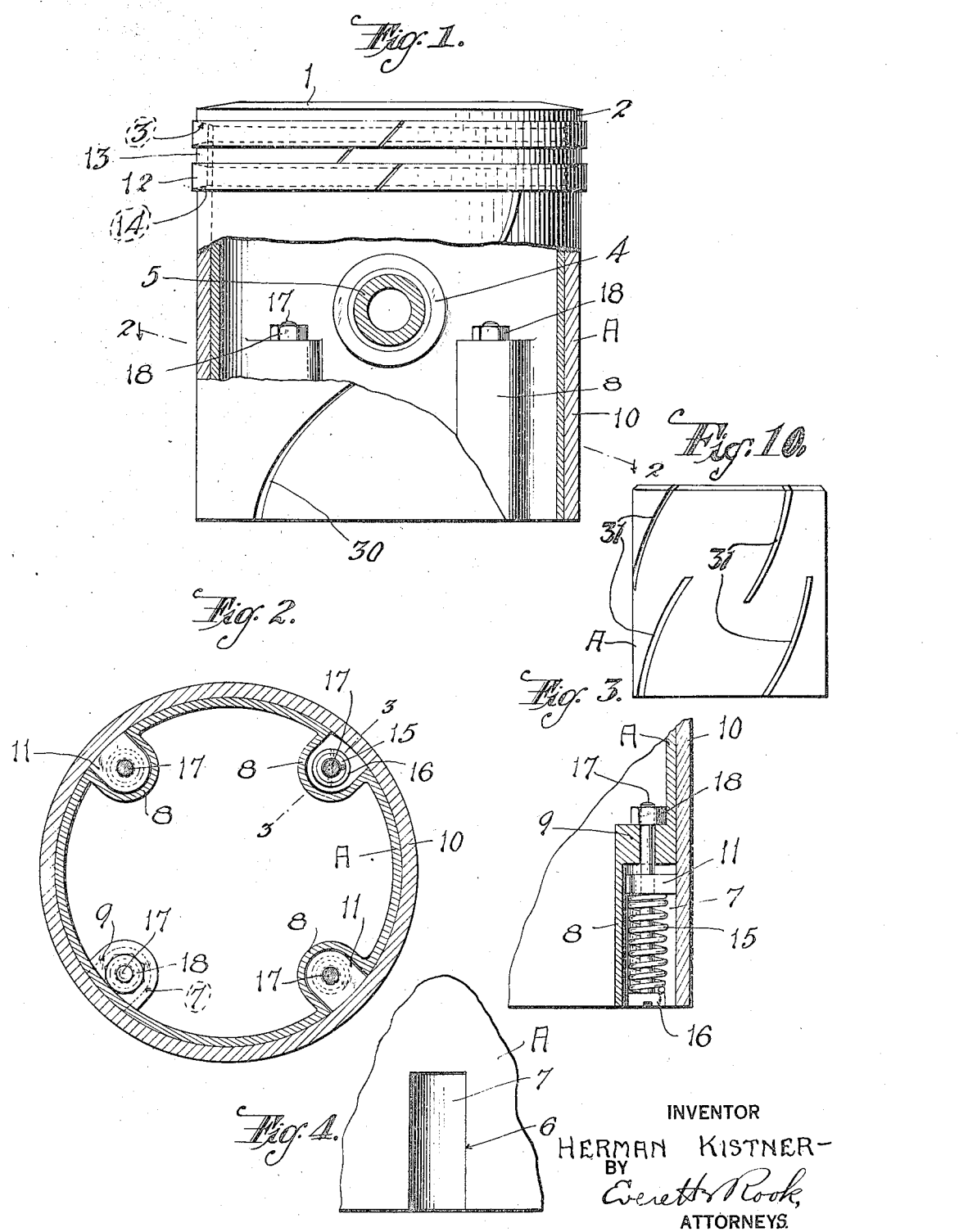

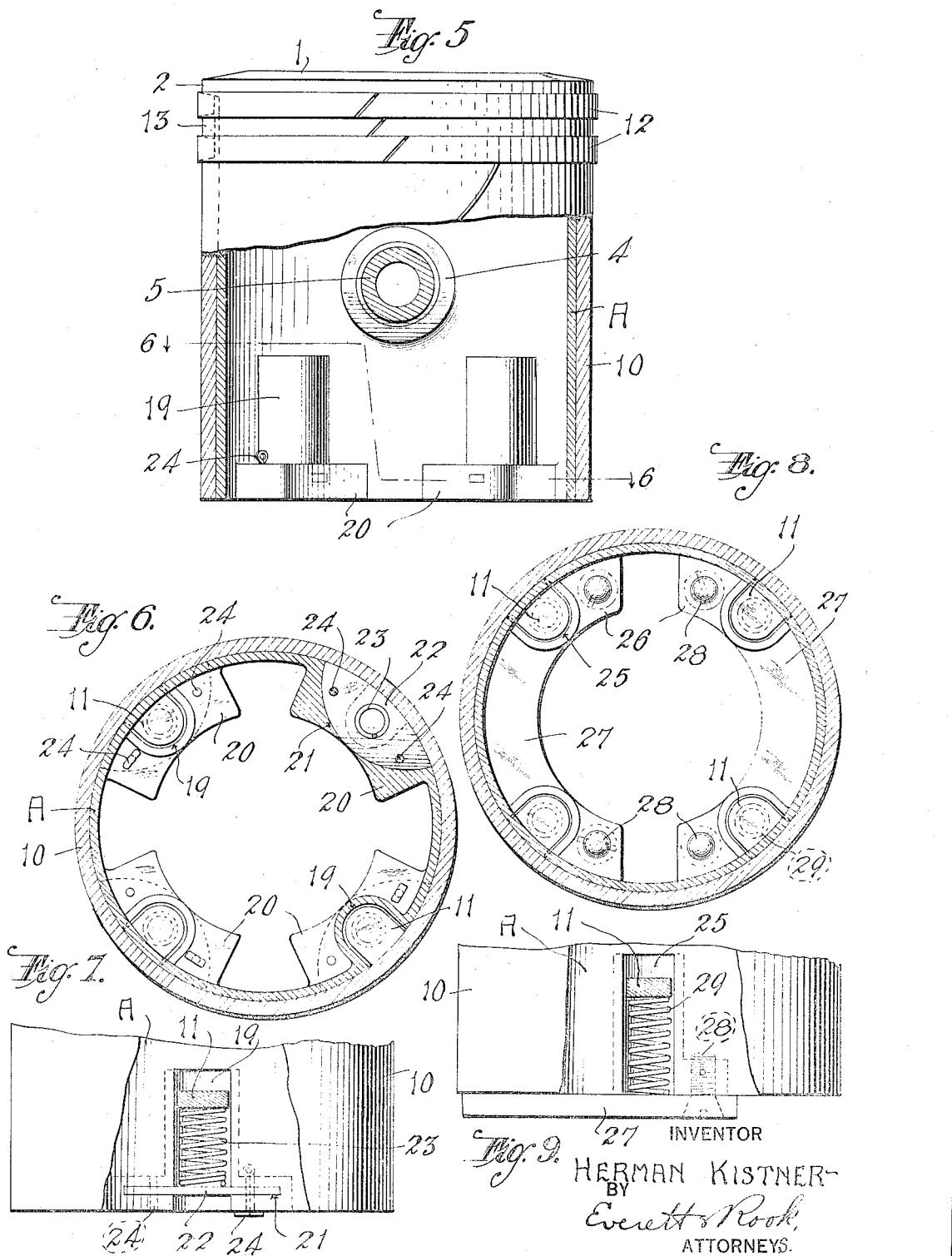

HERMAN KISTNER, OF ELIZABETH, NEW JERSEY.

PISTON.

1,423,615.  Specification of Letters Patent.  Patented July 25, 1922.

Application filed June 7, 1921. Serial No. 475,663.

*To all whom it may concern:*

Be it known that I, HERMAN KISTNER, a citizen of the United States, and a resident of Elizabeth, in the county of Union and State of New Jersey, have invented new and useful Improvements in Pistons, of which the following is a specification.

This invention relates in general to engine pistons of the type described in my co-pending application filed June 1, 1920, Serial No. 385,699 and comprising a piston body having a sleeve slidable thereon and influenced by spring pressure to maintain a yielding lateral compression on the piston rings to automatically and uniformly expand the rings into engagement with the cylinder walls.

The objects of the present invention are to provide a piston of the character described embodying novel features of construction whereby the parts of the piston can be easily and quickly assembled; to provide such a piston having improved means for mounting the springs whereby the springs can be easily and quickly placed in or removed from position in the piston in assembling or replacing the same; to provide a piston of this character having an improved construction for maintaining the springs in position and preventing buckling thereof; to provide in such a piston improved means for adjusting the compression of the springs, and to obtain other results and advantages as may be brought out by the following description.

Referring to the accompanying drawings, in which like numerals of reference indicate the same parts throughout the several views, Figure 1 is a side elevation partially in section of a piston constructed in accordance with my invention;

Figure 2 is a horizontal sectional view taken on the line 2—2 of Figure 1, the section being taken through the spring-receiving recesses at different elevations;

Figure 3 is a fragmentary vertical sectional view through one of the spring-receiving recesses taken on the line 3—3 of Figure 2;

Figure 4 is a fragmentary elevation of the piston body showing one of the spring-receiving recesses;

Figure 5 is a view similar to Figure 1 showing a modified form of the invention;

Figure 6 is a horizontal sectional view through the piston taken on the line 6—6 of Figure 5;

Figure 7 is a fragmentary side elevation of the lower portion of the piston with portions of the sleeve broken away, the spring-receiving recess being shown in side elevation;

Figure 8 is a horizontal sectional view through the piston showing another modified construction;

Figure 9 is a view similar to Figure 7 of the construction shown in Figure 8, and Figure 10 is a side elevation on a reduced scale of the sleeve provided with a modified arrangement of spiral slots for allowing expansion of the sleeve.

In the embodiment of my invention shown on the drawings, the reference character A designates the piston body which is formed at one end thereof with the solid head 1 and an annular flange 2 which is inclined at its underside inwardly as at 3. The piston body A is formed with integral bearings 4 to receive the wrist pin 5. The open end of the piston body A is formed with a plurality of slots 6, in the present instance four equidistantly spaced, the said slots opening through the end of the piston and into recesses 7 formed by curved walls 8 preferably formed integral with the piston body, as shown in Figures 2 and 3, the inner ends of the recesses 7 being closed by a wall 9.

A sleeve or jacket 10 is slidably mounted exteriorly of the piston body A and is formed with radial inwardly projecting lugs 11 which pass through the slots 6 in the piston body into the recesses 7. Packing rings 12 maintained in spaced relation by a spacer 13 are interposed between the flange 2 of the piston body and the inclined upper edge 14 of the sleeve 10, the sides of the rings 12 being beveled correspondingly to the flange 2 and end 14 of the sleeve. Compression springs 15 are positioned in the recesses 7 and interposed between the lugs 11 on the sleeve 10 and the heads 16 of bolts 17 which pass through the end walls 9 of the recesses 7 and the lugs 11 and are provided with adjustable nuts 18 at the inner ends thereof. In will thus be seen that the sleeve 10 will be influenced into engagement with the rings 12 by means of the springs 15, the compression of the springs automatically and uniformly expanding the rings 12 outwardly so as to hold them in yielding engagement with the walls of a cylinder.

The springs 15 are housed between the sleeve 10 and the walls 8 of the recesses 7 so that they are prevented from buckling and are protected from injury, and the compression of the said springs can be adjusted at will by means of the nuts 18 on the bolts 17.

A modified form of my invention is shown in Figures 5, 6 and 7 of the drawings in which the spring-receiving recesses 19 are formed substantially the same as shown in Figures 1-4 inclusive except that the inner ends thereof may be formed open. At the outer ends of the recessed 19 the piston body is formed with inwardly projecting lugs 20 which extend at both sides of the recesses 19, as shown in Figure 6. The lugs 20 are formed with substantially longitudinal slots 21 cut therein from the exterior and transversely of the piston body A, and plates 22 are fitted in said slots across the outer ends of the recesses 19 to serve as supports for one end of the springs 23, the opposite ends of which engage the lugs 11 projecting inwardly from the sleeve 10. The plates 22 may be secured within the slots 21 by means of suitable fastening members such as the cotter pins 24 which pass through the lugs 20 and the plates 22, as shown in Figures 6 and 7. The action of the springs 23 on the sleeve 10 and packing rings 12 is substantially as that shown and described in connection with Figure 1. While I have shown the slots 21 cut in the lugs 20 from the exterior of the piston body A it will be understood that they may also be cut from the inner edges of the lugs, and that the shape of the slots may be varied as desired.

In Figures 8 and 9 I have illustrated a further modification of the spring mounting for the piston in which the piston body A is formed at one side of the outer ends of the spring-retaining recesses 25 with lugs 26. Arcuate plates 27 are secured to the open end of the piston body A by means of screws or the like 28 passing through the ends of the plates and the corresponding lugs 26. The plates 27 serve as supports for one end of the springs 29, the opposite ends of which engage the lugs 11 of the sleeve 10 as above described.

It will be observed that in all of the constructions above described the springs can be easily and quickly placed in or removed from position in the piston body, and the spring-receiving recesses serve as guides for the springs and protect the same from buckling or injury. In each of the constructions shown in Figures 1-4 and Figures 5-7 the spring can be applied to and removed from the piston individually, it being merely necessary to remove the corresponding bolt 17 or plate 22 to remove one of the springs. The walls of the spring-receiving recesses also provide extended bearing surfaces for the lugs 11 and prevent rotation of the sleeve 10.

The piston body A and the sleeve 10 are preferably formed of aluminum, whereby an extremely light construction can be obtained, the construction of aluminum also enabling the piston to be die cast. The automatic and uniform expansion of the rings 12 relieves the sleeve 10 from wear, the rings 12 maintaining the piston in a perfectly balanced relation with the cylinder walls. The sleeve 10 may be formed with a spiral slot 30 which extends the full length of the sleeve to permit expansion of the sleeve under the heat in the cylinder, or under some conditions the sleeve may be provided with a plurality of spiral slots 31 which extend only a portion of the length of the sleeve and alternate ones of which open through opposite ends of the sleeve, as shown in Figure 10.

While I have shown and described certain embodiments of my invention it will be understood that this is for the purpose of illustrating the principles thereof only, and that many modifications and changes can be made in the detail construction of my invention without departing from the spirit or scope thereof. Therefore, I do not desire to be understood as limiting myself except as required by the following claims when construed in the light of the prior art.

Having thus described the invention, what I claim is:

1. A piston including a body having outwardly opening recesses in the walls thereof, a sleeve slidable on said body exteriorly thereof, and means arranged within said recesses for securing said body to said sleeve.

2. A piston including a body having outwardly opening recesses in the walls thereof, a sleeve slidable on said body exteriorly thereof and formed with inwardly projecting lugs arranged in said recesses, and springs arranged in said recesses and interposed between said lugs and said body.

3. A piston including a body having slots in the walls thereof and walls integral with said body extending inwardly from the edges of said slots to form recesses opening through said slots, a sleeve slidable on said body exteriorly thereof, and means arranged in said recesses for connecting said body and said sleeve.

4. A piston including a body having outwardly opening recesses in the walls thereof, a sleeve slidable on said body exteriorly thereof, a bolt having a head at one end thereof and a nut at the other end arranged in each of said recesses and connected at one end thereof to said body, and a spring mounted on said bolt and interposed between said sleeve and the other end of said bolt.

5. A piston including a body having outwardly opening recesses in the walls thereof, said recesses opening at one end through the end of said body and being closed at the other end, a bolt mounted in each of said recesses and secured at one end in the closed end thereof, said bolt being formed with a head at its other end, a sleeve slidable on said body exteriorly thereof, and springs interposed between the heads of said bolts and said sleeve.

6. A piston including a body having outwardly opening recesses in the walls thereof, said recesses opening at one end through the end of said body and being closed at the other end, a bolt mounted in each of said recesses and secured at one end in the closed end thereof, said bolt being formed with a head at its other end, a sleeve slidable on said body exteriorly thereof and formed with lugs projecting into said recesses, and springs mounted on said bolts and interposed between the heads thereof and said lugs.

7. A piston including a body having slots in the walls thereof and inward projections at one end of said slots, a sleeve slidable on said body exteriorly thereof and having projections arranged in said slots, bolts mounted at one end in said projections on the body and having heads at the other ends thereof, and springs interposed between the heads of said bolts and the corresponding projections on the said sleeve.

8. A piston including a body having transverse slots in the walls thereof, plates mounted in said slots, a sleeve slidable on said body exteriorly thereof, and means interposed between said plates and said sleeve to secure said sleeve to said body.

9. A piston including a body having longitudinal slots in the walls thereof and transverse slots intersecting said longitudinal slots, plates mounted in said transverse slots and extending across said longitudinal slots, a sleeve slidable on said body exteriorly thereof and formed with lugs projecting into said slots, and springs interposed between said plates and said lugs.

10. A piston including a body having longitudinal outwardly opening recesses and transverse slots formed in the walls thereof and intersecting said recesses, plates mounted in said transverse slots and extending across said recesses, a sleeve slidable on said body exteriorly thereof, and means housed in said recesses for securing said sleeve on said body.

11. A piston including a body having longitudinal slots therein opening through one end thereof, a sleeve slidable on said body exteriorly thereof, plates secured to the end of said body and closing the corresponding ends of said slots, and means arranged between said plates and sleeve for securing the sleeve on said body.

12. A piston including a body having longitudinal slots therein opening through one end thereof and formed with inwardly projecting lugs adjacent the open ends of said slots, a sleeve slidable on said body exteriorly thereof, a plurality of arcuate plates secured to said lugs and closing the ends of said slots, and means arranged between said plates and said sleeve for securing the sleeve to said body.

HERMAN KISTNER.